United States Patent
Kobayashi et al.

(10) Patent No.: US 7,821,772 B2
(45) Date of Patent: Oct. 26, 2010

(54) SOLID ELECTROLYTIC CAPACITOR

(75) Inventors: Yasumi Kobayashi, Yawata (JP); Takashi Umemoto, Hirakata (JP); Hiroshi Nonoue, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 87 days.

(21) Appl. No.: 12/124,263

(22) Filed: May 21, 2008

(65) Prior Publication Data
US 2009/0002923 A1 Jan. 1, 2009

(30) Foreign Application Priority Data
Jun. 29, 2007 (JP) ............................. 2007-171311

(51) Int. Cl.
*H01G 9/02* (2006.01)
*H01G 9/04* (2006.01)

(52) U.S. Cl. ..................... 361/525; 361/524; 361/532

(58) Field of Classification Search ......... 361/523–529, 361/532
See application file for complete search history.

(56) References Cited

U.S. PATENT DOCUMENTS

| | | | | |
|---|---|---|---|---|
| 4,943,892 A | * | 7/1990 | Tsuchiya et al. | 361/525 |
| 4,959,753 A | * | 9/1990 | Kudoh et al. | 361/525 |
| 5,019,949 A | * | 5/1991 | Ikeda et al. | 361/525 |
| 6,409,777 B2 | * | 6/2002 | Kobatake et al. | 29/25.03 |
| 6,515,848 B1 | * | 2/2003 | Yoshida et al. | 361/525 |
| 6,671,168 B2 | * | 12/2003 | Yoshida et al. | 361/523 |
| 6,862,170 B2 | * | 3/2005 | Tsai et al. | 361/523 |
| 7,126,812 B2 | * | 10/2006 | Hirata et al. | 361/524 |
| 7,221,554 B2 | * | 5/2007 | Brenneman et al. | 361/525 |
| 2003/0081374 A1 | * | 5/2003 | Takada | 361/523 |
| 2003/0133256 A1 | * | 7/2003 | Yoshida et al. | 361/523 |
| 2004/0104450 A1 | * | 6/2004 | Arai et al. | 257/532 |
| 2005/0164508 A1 | * | 7/2005 | Brenneman et al. | 438/689 |

FOREIGN PATENT DOCUMENTS

| JP | 07-122464 A1 | 5/1995 |
|---|---|---|
| JP | 2003-203828 A1 | 7/2003 |

* cited by examiner

*Primary Examiner*—Eric Thomas
(74) *Attorney, Agent, or Firm*—Marvin A. Motsenbocker; Mots Law, PLLC

(57) ABSTRACT

A solid electrolytic capacitor has an anode body including a porous sintered body consisting of a valve action metal, a dielectric layer deposited on a surface of the anode body, a conductive polymer layer deposited on a surface of the dielectric layer, and a cathode layer deposited on a surface of the conductive polymer layer. The conductive polymer layer includes a laminated film consisting of a first conductive polymer layer formed by a chemical polymerization process and a second conductive polymer layer formed by an electrolytic polymerization process. The first conductive polymer layer has recesses on its surface against the dielectric layer. Interior surfaces of such recesses define cavities which constitute pores at an interface between the first conductive polymer layer and the dielectric layer. These pores are distributed at intervals along the interface between the first conductive polymer layer and the dielectric layer in such a way that the dielectric layer is exposed to their interior surfaces.

5 Claims, 2 Drawing Sheets

FIG. 3 (A) CROSS-SECTION SEM IMAGE
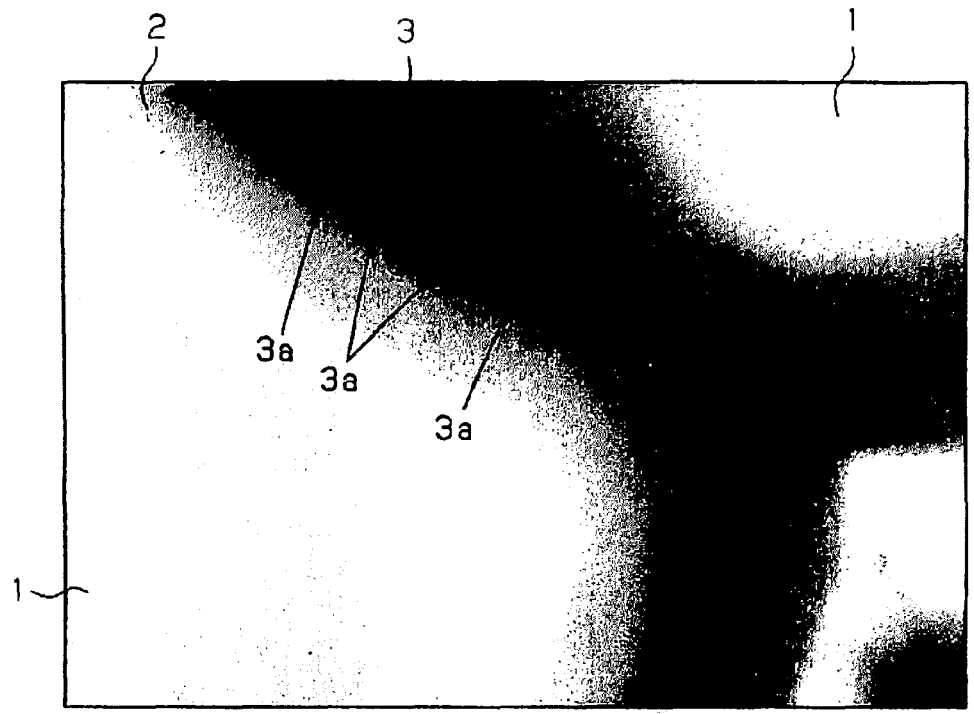
FIG. 3 (B) SKETCH
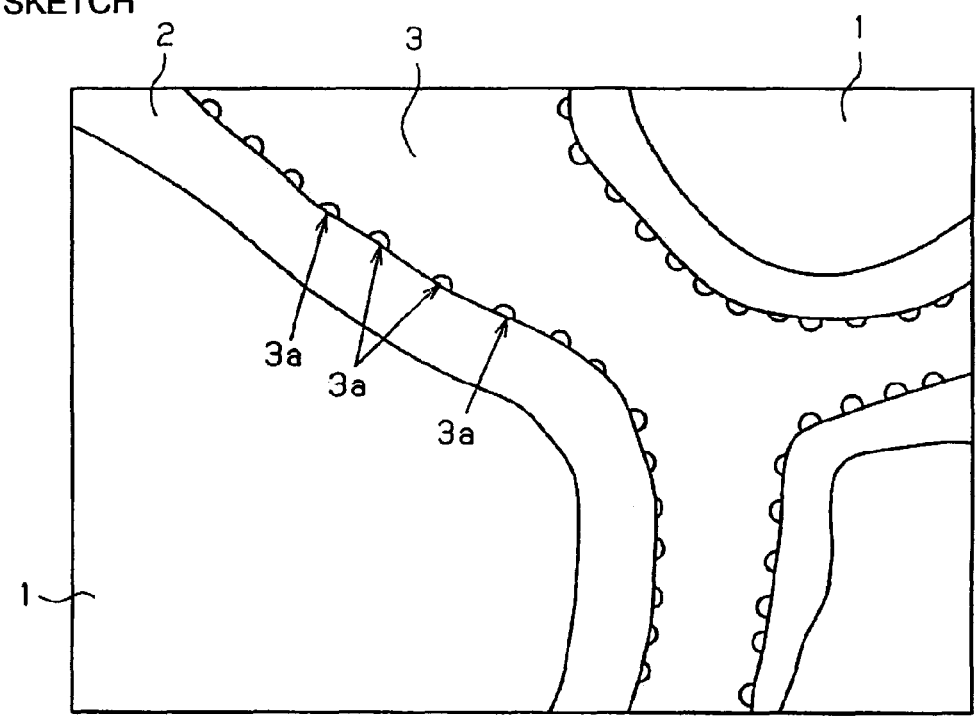

SOLID ELECTROLYTIC CAPACITOR

BACKGROUND OF THE INVENTION

1. Technical Field

The present invention relates to a solid electrolytic capacitor.

2. Description of Related Art

Solid electrolytic capacitors are generally fabricated by anodizing an anode consisting of a valve action metal such as niobium (Nb) or tantalum (Ta) to thereby form a dielectric layer consisting chiefly of an oxide on a surface of the anode, forming an electrolyte layer on the dielectric layer and then forming a cathode layer on the electrolyte layer. As one example of the electrolyte layer, a structure is proposed which comprises a laminate of a first conductive polymer layer consisting of polypyrrole prepared via chemical polymerization and a second conductive polymer layer consisting of polypyrrole prepared via electrolytic polymerization (see, for example, Japanese Patent Laid-Open No. Hei 4-48710).

SUMMARY OF THE INVENTION

However, such conventional solid electrolytic capacitors have suffered from a problem of capacitance decline due to the occurrence of separation between the dielectric layer and the electrolyte layer at their interface. Particularly when they are subjected to a heat treatment during a high-temperature test or a reflowing process for surface mounting parts, separation at the interface becomes more significant to cause further decline (deterioration) of capacitance. Hence, performance improvements have been strongly demanded for recent solid electrolytic capacitors.

The present invention is made in view of such problems and its object is to provide a solid electrolytic capacitor which is less susceptible to capacitance deterioration.

In order to achieve the object, a solid electrolytic capacitor in accordance with the present invention has an anode, a cathode including a conductive polymer layer, and a dielectric layer provided between the anode and the cathode such that it contacts the conductive polymer layer. Characteristically, pores are formed at an interface between the conductive polymer layer and the dielectric layer.

In accordance with the present invention, a solid electrolytic capacitor is provided which is less susceptible to capacitance deterioration.

BRIEF DESCRIPTION OF THE DRAWINGS

FIGS. 3(A) and 3(B) are a cross-section SEM image of the solid electrolytic capacitor of Example 1, showing the anode body and its vicinity, and a sketch of the anode and its vicinity corresponding to the cross-section SEM image, respectively.

DESCRIPTION OF THE PREFERRED EMBODIMENT

Figure 1:
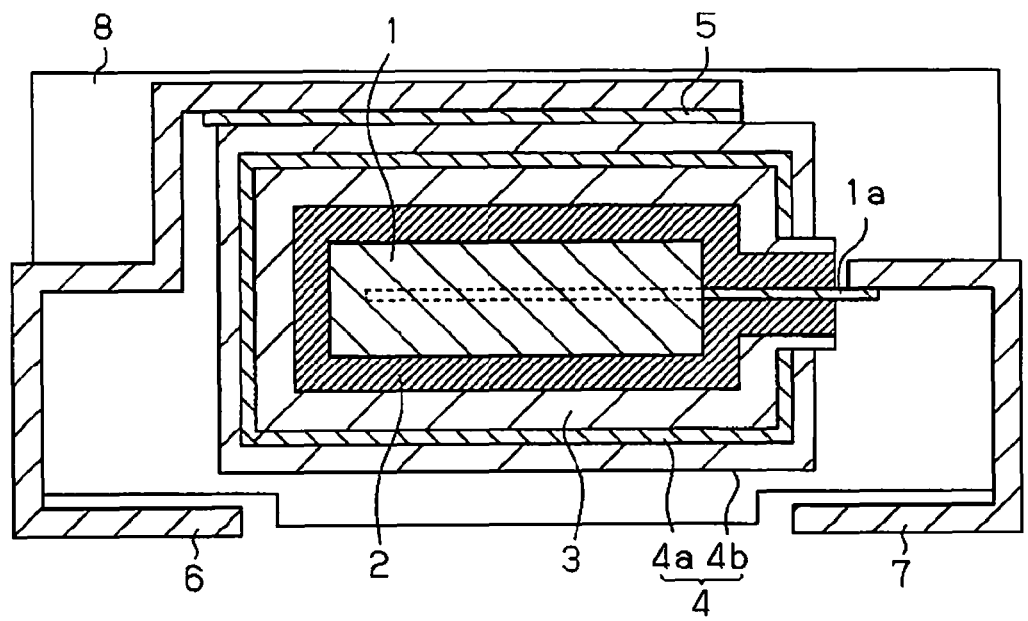
FIG. 1 is a schematic sectional view, showing a construction of the solid electrolytic capacitor in accordance with one embodiment of the present invention.
Figure 2:
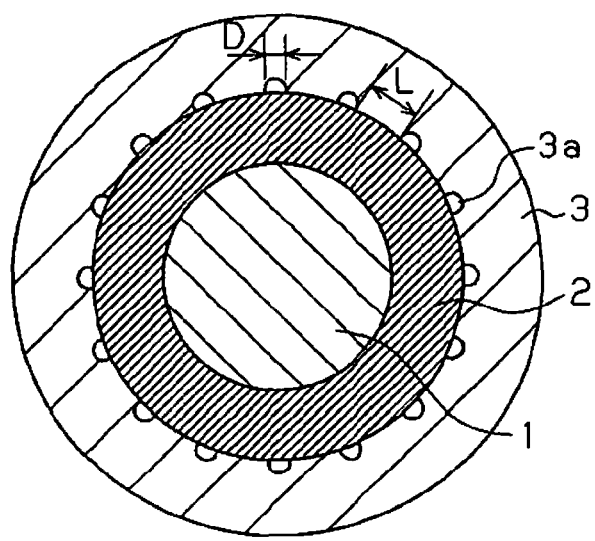
FIG. 2 is an enlarged view of the solid electrolytic capacitor of FIG. 1, showing the anode body and its vicinity.

An embodiment of the present invention is below described with reference to the drawings. This embodiment is not intended to limit the present invention. FIG. 1 is a schematic sectional view, showing a construction of a solid electrolytic capacitor in accordance with the embodiment. FIG. 2 is an enlarged view of the solid electrolytic capacitor of FIG. 1, which shows an anode body and its vicinity and corresponds to a sectional structure for one of metal particles constituting the anode body.

The solid electrolytic capacitor of this embodiment has an anode body 1, a dielectric layer 2 deposited on a surface of the anode body 1, a conductive polymer layer 3 deposited on the dielectric layer 2 and a cathode layer 4 deposited on the conductive polymer layer 3, as shown in FIG. 1. As shown in FIG. 2, pores 3a are provided at an interface between the conductive polymer layer 3 and the dielectric layer 2. Such pores 3a are distributed at intervals along the interface between the conductive polymer layer 3 and the dielectric layer 2 and have interior surfaces to which the dielectric layer 2 is exposed. As used in this embodiment, the "pore" refers to a configuration wherein a recess of the conductive polymer layer 3 on its surface against the dielectric layer 2 defines a cavity by its interior at the interface between the conductive polymer layer 3 and dielectric layer 2.

A specific construction of the solid electrolytic capacitor is as follows.

The anode body 1 comprises a porous sintered body of valve action metal particles. An anode lead 1a made of a valve action metal is partly embedded in the anode body. The valve action metal constituting the anode lead 1a and the anode body 1 can be selected from metallic materials capable of formation of an insulating oxide film, such as niobium, tantalum and titanium (Ti). Alloys between two or more of such valve action metals may also be used.

The dielectric layer 2 comprises a dielectric in the form of an oxide of a valve action metal and overlies the anode lead 1a and the anode body 1. In an exemplary case where the valve action metal is a niobium metal, the dielectric layer 2 comprises a niobium oxide. Also in this embodiment, fluorine (F) is contained in the dielectric layer 2 and concentrated toward its anode side. Specifically, fluorine has a concentration distribution in a thickness direction (i.e., a direction from a cathode side toward an anode side of the dielectric layer 2) of the dielectric layer 2. A fluorine concentration amounts to a maximum at an interface between the dielectric layer 2 and the anode body 1.

The conductive polymer layer 3 serves as an electrolyte layer and overlies the dielectric layer 2. This conductive polymer layer 3 comprises a laminated film consisting of a first conductive polymer layer formed by a chemical polymerization process and a second conductive layer formed by an electrolytic polymerization process. The first conductive polymer layer has plural recesses on its surface against the dielectric layer 2. These recesses define cavities therein that constitute pores 3a at the interface of the first conductive polymer layer and the dielectric layer 2. As shown in FIG. 2, such pores 3a are distributed at intervals along the interface between the first conductive polymer layer and the dielectric layer 2 and configured such that the dielectric layer 2 is exposed to their interior surfaces. Also, the pores 3a are distributed with the predetermined pore size D and interval L. The material for the conductive polymer layer 3 (first and second conductive polymer layers) is not particularly specified in type, so long as it is an electrically conductive polymeric material. However, highly conductive materials such as polypyrrol, polythiophene, polyaniline and polyfuran are preferably used.

The cathode layer 4 comprises a laminated film consisting of a carbon layer 4a containing carbon particles and a silver paste layer 4b containing silver particles and overlies the conductive polymer layer 3. Such cathode layer 4 and the conductive polymer layer 3 together constitute a cathode.

Also in this embodiment, a flat sheet cathode terminal 6 is connected onto the cathode layer 4 through a conductive adhesive 5. A flat sheet anode terminal 7 is connected to the anode lead 1a. Each of the anode terminal 7 and the cathode terminal 6 extends partly from within a molded casing 8 made of an epoxy resin or the like, as shown in FIG. 1. A useful material for the anode terminal 7 and the cathode terminal 6 is a conductive material such as nickel (Ni). The respective end portions of the anode terminal 7 and the cathode terminal 6 that extend from within the molded casing 8 are folded inward to serve as terminals of the solid electrolytic capacitor of the present invention.

The anode body 1, dielectric layer 2, conductive polymer layer 3 and pore 3a illustrate respective examples of "anode", "dielectric layer", "conductive polymer layer" and "pore" of the present invention.

(Fabrication Method)

A fabrication method of the solid electrolytic capacitor embodiment shown in FIG. 1 is now described.

(Step 1) Metal particles capable of valve action are provided to surround a part of the anode lead 1a, compacted into a shape such that the part of the anode lead 1a is embedded therein, and then sintered under vacuum. The resulting porous sintered body constitutes the anode body 1. On this occasion, melt welding occurs between the metal particles.

(Step 2) The anode body 1 is anodized in an aqueous solution of ammonium fluoride to form the dielectric layer 2 that comprises an oxide of the valve action metal and covers the anode body 1. During this step, fluorine is incorporated in the dielectric layer 2. Distribution of fluorine is such that it is concentrated toward an anode side (interface of the dielectric layer 2 with the anode body 1) of the dielectric layer 2.

(Step 3) The first conductive polymer layer is deposited on a surface of the dielectric layer 2 with the use of a chemical polymerization process (first stage). Specifically, in this chemical polymerization process, an oxidizing agent is employed to polymerize a monomer oxidatively to form the first conductive polymer layer. In this embodiment, chemical polymerization is carried out while varying a temperature with the prescribed amplitude and period, so that pores 3a are generated along the interface between the dielectric layer 2 and the first conductive polymer layer.

Subsequently, the second conductive polymer layer is deposited on a surface of the first conductive polymer layer by using an electrolytic polymerization process (second stage). Specifically, in this electrolytic polymerization process, the first conductive polymer layer serves as an anode. That is, electrolytic polymerization is carried out in an electrolyte solution containing a monomer and an electrolyte and between the first conductive polymer layer anode and an external cathode to thereby form the second conductive polymer layer.

By the above-described procedure, the conductive polymer layer 3 comprising a laminated film consisting of the first conductive polymer layer and the second conductive polymer layer is deposited on the dielectric layer 2, while plural pores 3a are distributed at intervals along the interface between the dielectric layer 2 and the conductive polymer layer 3.

(Step 4) A carbon paste is applied onto the conductive polymer layer 3 and dried to form the carbon layer 4a. Further, a silver paste is applied onto the carbon layer 4a and dried to form the silver paste layer 4b. This procedure results in the formation of the cathode layer 4 comprising a laminated film consisting of the carbon layer 4a and the silver paste layer 4b on the conductive polymer layer 3.

(Step 5) The conductive adhesive 5 is applied onto the flat sheet cathode terminal 6. Subsequently, the cathode layer 4 and the cathode terminal 6 are brought into contact with each other, with the conductive adhesive 5 between them, and dried while they are held together to connect the cathode terminal 6 to the cathode layer 4. Also, the flat sheet anode terminal 7 is spot welded onto the anode lead 1a for connection.

(Step 6) The molded casing 8 is fabricated by a transfer molding process using an epoxy resin. The molded casing 8 is configured to enclose the anode lead 1a, anode body 1, dielectric layer 2, conductive polymer layer 3 and cathode layer 4 and allow respective end portions of the anode terminal 7 and cathode terminal 6 to extend to an outside (in opposite directions).

(Step 7) The respective end portions of the anode terminal 7 and the cathode terminal 6 that extend from within the molded casing 8 are folded inwardly so that they extend along a bottom surface of the molded casing 8. The respective end portions of these terminals serve as terminals of the solid electrolyte capacitor and are utilized to electrically connect the solid electrolytic capacitor to a mounting substrate.

The preceding steps result in the fabrication of the solid electrolytic capacitor embodiment in accordance with the present invention.

EXAMPLES

In the following Examples and Comparative Examples, a procedure was continued up to the step of forming a cathode layer to fabricate solid electrolytic capacitors, followed by evaluation of their performance characteristics.

Example 1

In Example 1, those corresponding to the steps (Step 1-Step 4) of the above fabrication method were carried out to fabricate a solid electrolytic capacitor A1.

(Step 1A) A niobium metal powder is provided whereby a CV value, which is a product of a capacitance of a porous niobium sintered body after formation of an electrolytic oxidation film (dielectric layer) and an electrolytic voltage, amounts to 150,000 µF·V/g. This niobium metal powder was compacted into a shape such that the anode lead 1a is partly embedded in the shape and then sintered under vacuum at a temperature of about 1,200° C. This results in the formation of an anode body 1 which comprises a porous niobium sintered body. On this occasion, melt welding occurs between niobium metal powder particles. Hereinafter, the CV value in Examples and Comparative Examples is 150,000 µF·V/g unless otherwise specified.

(Step 2A) The anode body 1 is anodized at a constant voltage of about 10 V for about 10 hours in an about 0.1 wt. % aqueous ammonium fluoride solution maintained at about 60° C. By this treatment, a dielectric layer 2 comprising a niobium oxide containing fluorine is deposited around the anode body 1 for coverage, wherein fluorine has a concentration gradient in the thickness direction of the dielectric layer 2 and its concentration reaches a maximum at an interface between the dielectric layer 2 and the anode body 1.

(Step 3A) The anode body 1 covered with the dielectric layer 2 is dipped in a solution of an oxidizing agent to deposit the oxidizing agent on the dielectric layer 2. It is then brought in a constant-temperature tank where the dielectric layer 2 is held in a pyrrole monomer vapor. Polymerization of the pyrrole monomer is then effected in a temperature-controlled fashion at a central temperature of 25° C. (amplitude 2.0° C., period 10 minutes) for 40 minutes (first stage). This results in the formation of a first conductive polymer layer comprised of polypyrrole on the dielectric layer 2. During this stage, plural pores 3 are generated at intervals along the interface between the dielectric layer and the first conductive polymer layer. Under the above temperature control, those pores 3 are generated at the interface such that the dielectric layer 2 is exposed to their interior surfaces and finished with a mean pore size of 10 nm and a mean interpore distance of 50 nm (5 times the mean pore size). This is presumably because the above temperature control not only eases air bubbles generated on a surface of the electrolytic layer 2 at an initial stage of a reaction to be trapped within the conductive polymer layer, but also permits the trapped air bubbles to grow or build up. In the present invention, the following method is utilized to determine the pore size D in terms of a mean pore size. About 100 pores are sampled such as from a cross-section SEM (scanning electron microscope) image of the anode body and its vicinity. A maximum inner diameter in a section of each pore is defined as a pore size. The collected pore size values are then averaged to determine the mean pore size. Also, the following method is utilized to determine the interpore distance L in terms of a mean interpore distance. Likewise with the above method, an edge-to-edge distance between neighboring pores is sampled for about 100 pores. The collected distance values are then averaged to determine the mean interpore distance.

Subsequently, electrolytic polymerization is effected in an electrolyte solution containing a pyrrole monomer and an electrolyte and between the first conductive polymer layer serving as an anode and an external cathode, so that a second conductive polymer layer is further deposited on the first conductive polymer layer to a predetermined thickness (second stage).

The above-described procedure results not only in the formation of a conductive polymer layer 3 comprising a laminated film consisting of the first conductive polymer layer and the second conductive polymer layer on the dielectric layer 2, but also in the distribution of plural pores 3a at intervals along the interface between the dielectric layer 2 and the conductive polymer layer 3.

(Step 4A) A carbon paste is applied onto the conductive polymer layer 3 and dried to form a carbon layer 4a comprising a layer containing carbon particles. A silver paste is applied onto the carbon layer 4a and dried to form a silver paste layer 4b comprising a layer containing silver particles. This results in the formation of a cathode layer 4 on the conductive polymer layer 3, which comprises a laminated film consisting of the carbon layer 4a and the silver paste layer 4b.

By the preceding procedure, a solid electrolytic capacitor A1 of Example 1 is fabricated.

Example 2

In the first stage of Step 3A, the temperature control condition was changed from the 10 minutes period (central temperature 25° C., amplitude 2.0° C.) to a 5 minutes period (central temperature 25° C., amplitude 2.0° C.) to generate pores. Otherwise, the procedure of Example 1 was followed to fabricate a solid electrolytic capacitor A2. The pores generated under the above condition had a mean pore size of 1 nm and a mean interpore distance of 5 nm (5 times the mean pore size).

Examples 3-9

In the first stage of Step 3A, the temperature control condition was changed from the 10 minutes period (central temperature 25° C., amplitude 2.0° C.) to 10 seconds, 7 minutes, 8 minutes, 13 minutes, 17 minutes, 20 minutes and 60 minutes periods (central temperature 25° C., amplitude 2.0° C.) to generate pores. Otherwise, the procedure of Example 1 was followed to fabricate solid electrolytic capacitors A3-A9. Under such conditions, the pores were generated having the mean pore size and mean interpore distance (L/D ratio) specified in Table 1.

Example 10

In the first stage of Step 3A, the temperature control condition was changed from the 2.0° C. amplitude (central temperature 25° C., period 10 minutes) to a 5.0° C. amplitude (central temperature 25° C., period 10 minutes) to generate pores. Otherwise, the procedure of Example 1 was followed to fabricate a solid electrolytic capacitor A10. The pores generated under this condition had a mean pore size of 10 nm and a mean interpore distance of 20 nm (2 times the mean pore size).

Examples 11-18

In the first stage of Step 3A, the temperature control condition was changed from the 2.0° C. amplitude (central temperature 25° C., period 10 minutes) to 10.0° C., 4.0° C., 3.0° C., 1.7° C., 1.5° C., 1.3° C., 1.0° C. and 0.2° C. amplitudes (central temperature 25° C., period 10 minutes) to generate pores. Otherwise, the procedure of Example 1 was followed to fabricate solid electrolytic capacitors A11-A18. Under such conditions, the pores were generated having the mean pore size and mean interpore distance (L/D ratio) specified in Table 2.

Comparative Example

In the first stage of Step 3A, the temperature control condition was changed to a constant temperature (25° C.), as practiced heretofore, to form the first conductive polymer layer. Otherwise, the procedure of Example 1 was followed to fabricate a solid electrolytic capacitor X. Under this condition, the first conductive polymer layer is formed without occurrence of pores at its interface with the dielectric layer.

(Evaluation)

First, a cross section of the anode body and its vicinity in the solid electrolytic capacitor A1 of Example 1 was observed. FIG. 3(A) is a cross-section SEM image of the porous sintered body constituting the anode body. FIG. 3(B) is a sketch of the anode body and its vicinity, which corresponds to the cross-section SEM image. As can be clearly seen from FIG. 3, plural pores 3a are distributed at intervals along the interface between the dielectric layer 2 and the conductive polymer layer 3 and respectively have interior surfaces to which the dielectric layer 2 and the conductive polymer layer 3 are exposed.

Next, each solid electrolytic capacitor was evaluated for capacitance retention. Table 1 shows the evaluation results (mean pore size dependence) for capacitance retention of the solid electrolytic capacitor and Table 2 shows the evaluation results (mean interpore distance dependence) for capacitance retention of the solid electrolytic capacitor.

The capacitance retention is calculated from the following equation (1) using a capacitance of the capacitor prior to and subsequent to a high-temperature storage test. This value, if closer to 100, indicates less deterioration of capacitance.

Capacitance retention (%)=(capacitance subsequent to
the high temperature storage test/capacitance
prior to the high temperature storage test)×100     (1)

The measurement conditions of capacitance are as follows.

Capacitance (capacitance of solid electrolytic capacitor at 120 Hz frequency) of each solid electrolytic capacitor, prior to and subsequent to a high temperature storage test where the solid electrolytic capacitor is stored for 2,000 hours in a constant temperature tank maintained at 105° C., is measured using an LCR meter.

TABLE 1

|  |  | Temperature Conditions | | Mean Pore | Mean Interpore Distance | Capacitance |
| --- | --- | --- | --- | --- | --- | --- |
|  |  | Amplitude | Period | Size | (L/D Ratio) | Retention |
| Ex. 3 | Solid Electrolytic Capacitor A3 | 2.0° C. | 10(sec.) | 0.5 nm | 2.5 nm(5 times) | 80% |
| Ex. 2 | Solid Electrolytic Capacitor A2 | 2.0° C. | 5(min.) | 1 nm | 5 nm(5 times) | 91% |
| Ex. 4 | Solid Electrolytic Capacitor A4 | 2.0° C. | 7(min.) | 5 nm | 25 nm(5 times) | 92% |
| Ex. 5 | Solid Electrolytic Capacitor A5 | 2.0° C. | 8(min.) | 7 nm | 35 nm(5 times) | 95% |
| Ex. 1 | Solid Electrolytic Capacitor A1 | 2.0° C. | 10(min.) | 10 nm | 50 nm(5 times) | 98% |
| Ex. 6 | Solid Electrolytic Capacitor A6 | 2.0° C. | 13(min.) | 15 nm | 75 nm(5 times) | 95% |
| Ex. 7 | Solid Electrolytic Capacitor A7 | 2.0° C. | 17(min.) | 20 nm | 100 nm(5 times) | 93% |
| Ex. 8 | Solid Electrolytic Capacitor A8 | 2.0° C. | 20(min.) | 50 nm | 250 nm(5 times) | 90% |
| Ex. 9 | Solid Electrolytic Capacitor A9 | 2.0° C. | 60(min.) | 70 nm | 350 nm(5 times) | 80% |
| Comp. Ex. | Solid Electrolytic Capacitor X | — | — | — | — (—) | 58% |

As can be seen from Table 1, improved capacitance retention relative to the conventional one of Comparative Example (solid electrolytic capacitor X) is obtained for all those of Examples 1-9 (solid electrolytic capacitors A1-A9) which each include pores distributed along the interface between the dielectric layer and the conductive polymer layer and having the specified mean pore size, demonstrating that the presence of those pores suppresses deterioration of capacitance. The following is presumed to explain the reason. When a heat load is applied to the capacitor, a stress is produced therein due to a difference in thermal expansion coefficient between the dielectric layer and the conductive polymer layer. However, this stress is relaxed as the pores present at the interface deform (expand and shrink). Accordingly, separation is prevented to occur between the conductive polymer layer and the dielectric layer.

Also, decline of capacitance retention can be further suppressed when the pores have a mean pore size in the range of 1 nm-50 nm, among the given Examples. In particular, the above-described effect becomes most significant when the pores have a mean pore size of 10 nm. The effect of the pores having a mean pore size of 0.5 nm to suppress decline of capacitance retention is small. This is presumably because, due to such small mean pore size of the pores present at the interface, a sufficient stress relaxing effect is not obtained through their deformation. The effect of the pores having a mean pore size of 70 nm to suppress decline of capacitance retention is also small. This is presumably because, due to such large mean pore size of the pores present at the interface, a contact area of the dielectric layer and the conductive polymer layer decreases to the level as if separation occurred between the dielectric layer and the conductive polymer layer.

TABLE 2

|  |  | Temperature Conditions | | Mean Pore | Mean Interpore Distance | Capacitance |
| --- | --- | --- | --- | --- | --- | --- |
|  |  | Amplitude | Period | Size | (L/D Ratio) | Retention |
| Ex. 11 | Solid Electrolytic Capacitor A11 | 10.0° C. | 10(min.) | 10 nm | 15 nm(1.5 times) | 81% |
| Ex. 10 | Solid Electrolytic Capacitor A10 | 5.0° C. | 10(min.) | 10 nm | 20 nm(2 times) | 90% |

TABLE 2-continued

|  |  | Temperature Conditions | | Mean Pore | Mean Interpore Distance | Capacitance |
|---|---|---|---|---|---|---|
|  |  | Amplitude | Period | Size | (L/D Ratio) | Retention |
| Ex. 12 | Solid Electrolytic Capacitor A12 | 4.0° C. | 10(min.) | 10 nm | 30 nm(3 times) | 93% |
| Ex. 13 | Solid Electrolytic Capacitor A13 | 3.0° C. | 10(min.) | 10 nm | 40 nm(4 times) | 95% |
| Ex. 1 | Solid Electrolytic Capacitor A1 | 2.0° C. | 10(min.) | 10 nm | 50 nm(5 times) | 98% |
| Ex. 14 | Solid Electrolytic Capacitor A14 | 1.7° C. | 10(min.) | 10 nm | 60 nm(6 times) | 95% |
| Ex. 15 | Solid Electrolytic Capacitor A15 | 1.5° C. | 10(min.) | 10 nm | 70 nm(7 times) | 93% |
| Ex. 16 | Solid Electrolytic Capacitor A16 | 1.3° C. | 10(min.) | 10 nm | 80 nm(8 times) | 92% |
| Ex. 17 | Solid Electrolytic Capacitor A17 | 1.0° C. | 10(min.) | 10 nm | 100 nm(10 times) | 91% |
| Ex. 18 | Solid Electrolytic Capacitor A18 | 0.2° C. | 10(min.) | 10 nm | 120 nm(12 times) | 82% |
| Comp. Ex. | Solid Electrolytic Capacitor X | — | — | — | — (—) | 58% |

As can be seen from Table 2, improved capacitance retention relative to the conventional one of Comparative Example (solid electrolytic capacitor X) is obtained for all those of Examples 1 and 10-18 (solid electrolytic capacitors A1 and A10-A18) which each include pores distributed with the specified mean interpore distance along the interface between the dielectric layer and the conductive polymer layer, demonstrating that the presence of such pores suppresses capacitance deterioration. Also, decline of capacitance retention can be further suppressed when the pores are distributed such that their mean interpore distance is 2-10 times the mean pore size, among the given Examples. The above-described effect becomes most significant particularly when the mean interpore distance is 5 times the mean pore size. The effect of the pores to suppress decline of capacitance retention is small when their interpore distance is 1.5 times the mean pore size. This is presumably because, due to the presence of densely distributed pores, a contact area between the dielectric layer and the conductive polymer layer decreases to the level as if separation occurred between the dielectric layer and the conductive polymer layer. Also when the interpore distance is 12 times the mean pore size, the effect of the pores to suppress decline of capacitance retention is small. This is presumably because, due to the sparse presence of the pores at the interface, a sufficient stress relaxing effect is not obtained through their deformation.

The following effects can be obtained from the preceding solid electrolytic capacitor embodiments in accordance with the present invention.

(1) The pores 3a are distributed at intervals along the interface between the dielectric layer 2 and the conductive polymer layer 3. Accordingly, a stress produced when a heat load is applied, due to a difference in thermal expansion coefficient between the dielectric layer 2 and the conductive polymer layer 3, is relaxed as those pores 3a present at the interface deform (expand and shrink), so that separation between the dielectric layer 2 and the conductive polymer layer 3 can be restrained. As a result, a solid electrolytic capacitor can be obtained which is less susceptible to capacitance deterioration.

(2) The pores 3a are provided at the interface between the dielectric layer 2 and the conductive polymer layer 3 in such a way that the dielectric layer 2 is exposed to interior surfaces of the pores. This makes it easy for the conductive polymer layer 3 in the vicinity of the interface to expand or shrink along the surface portions of the dielectric layer 2 that are exposed to the interior surfaces of the pores 3a, and accordingly permits more effective deformation of the pores 3a. As a result, separation between the dielectric layer 2 and the conductive polymer layer 3 at their interface can be restrained more certainly to thereby further suppress decline of capacity retention.

(3) The pores 3a are provided in the form of cavities within recesses on a surface of the conductive polymer layer 3 that is more plastic than the dielectric layer 2. This renders the pores 3a more deformable. Accordingly, the preceding effects (1) and (2) can be obtained more significantly.

(4) The preceding effects (1)-(3) can be obtained more significantly when pore sizes of the pores 3a present at the interface between the dielectric layer 2 and the conductive polymer layer 3 are controlled to fall within the range of 1 nm-50 nm in terms of mean pore size.

(5) At least the preceding effects (1)-(3) can be obtained more significantly when the pores 3a present at the interface between the dielectric layer 2 and the conductive polymer layer 3 are distributed such that a mean interpore distance thereof amounts to 2-10 times the mean pore size.

The present invention is not limited to the above-described embodiments (Examples). It will be readily apparent to those who have a knowledge in the art that various design changes and modifications can be made without departing from the scope of the present invention. All of embodiments (Examples) after such changes and modifications are also contemplated as being within the scope of the present invention.

Although a niobium metal is used in the preceding Examples, the present invention is not limited thereto. Any other valve action metal, such as tantalum or titanium, or its alloy can be used, for example. Even in such a case, the corresponding effects can be obtained by introducing the pores at the interface between the dielectric layer and the conductive polymer layer overlying the metal.

Although the conductive polymer layer is described in the preceding Examples as comprising polypyrrole, the present invention is not limited thereto. The conductive polymer layer may comprise polythiophene, polyaniline or polyfuran, for example. Even in such a case, the pores can be introduced at the interface between the dielectric layer and the conductive polymer layer by effecting the above-described temperature control, resulting in obtaining the corresponding effects.

In the preceding embodiments, the pores are generated at the interface between the dielectric layer and the conductive polymer layer by effecting the prescribed temperature control while the conductive polymer layer is deposited on the dielectric layer. However, the present invention is not limited thereto. For example, a method may be utilized wherein micropits (minute cavities) are generated in a surface portion of the dielectric layer when deposited on a surface of the anode body and then the conductive polymer layer is deposited under conventional temperature control so that pores are generated at locations corresponding to the micropits. In this method, the sizes of the pores generated subsequent to formation of the conductive polymer layer can be controlled by treating the deposited dielectric layer with an acidic agent for actualization of the micropits in the dielectric layer. Even in the such-fabricated solid electrolytic capacitor, the pores can be introduced at the interface between the conductive polymer layer and the dielectric layer, so that at least the preceding effects (1) and (2) can be obtained.

The other technical concept which can also be clarified by the preceding embodiments in accordance with the present invention but not claimed herein is now described together with effects thereof.

It is a method for fabrication of a solid electrolytic capacitor which includes a first step in which an anode surface is anodized to form a dielectric layer and a second step in which a conductive polymer layer is deposited on the dielectric layer. Characteristically, the second step includes a first stage where a first conductive polymer layer is deposited on the dielectric layer by a chemical polymerization process and a second stage where a second conductive polymer layer is deposited on the first conductive polymer layer by an electrolytic polymerization process. In the first stage, a treatment temperature during chemical polymerization is varied according to the prescribed amplitude and period to generate pores at the interface between the first conductive polymer layer and the dielectric layer.

(6) In accordance with this fabrication method, an adequate solid electrolytic capacitor can be fabricated which is similar to those described in (1)-(5).

(7) In accordance with this fabrication method, a solid electrolytic capacitor can be fabricated having pores introduced at the interface between the first conductive polymer layer constituting the conductive polymer layer and the dielectric layer by modifying the temperature control conditions during the chemical polymerization process. This method readily realizes a solid electrolytic capacitor which is less susceptible to capacitance deterioration.

What is claimed is:

1. A solid electrolytic capacitor comprising an anode, a cathode including a conductive polymer layer, and a dielectric layer provided between the anode and the cathode such that the dielectric layer contacts the conductive polymer layer, wherein said conductive polymer layer comprises a first conductive polymer layer formed on said dielectric layer and a second conductive polymer layer formed on said first conductive polymer layer, and pores are defined at an interface between said first conductive polymer layer and said dielectric layer so as to be trapped within said first conductive polymer layer.

2. The solid electrolytic capacitor as recited in claim 1, wherein said pores are defined by recesses on a surface of said conductive polymer layer.

3. The solid electrolytic capacitor as recited in claim 1, wherein said pores have a mean pore size in the range of 1 nm-50 nm.

4. The solid electrolytic capacitor as recited in claim 1, wherein said pores are distributed such that their mean inter-pore distance is 2-10 times their mean pore size.

5. The solid electrolytic capacitor as recited in claim 3, wherein said pores are distributed such that their mean inter-pose distance is 2-10 times their mean pore size.

* * * * *